United States Patent [19]

Matesa

[11] Patent Number: 4,780,121
[45] Date of Patent: Oct. 25, 1988

[54] METHOD FOR RAPID INDUCTION HEATING OF MOLTEN GLASS OR THE LIKE

[75] Inventor: Joseph M. Matesa, Plum Boro, Pa.

[73] Assignee: PPG Industries, Inc., Pittsburgh, Pa.

[21] Appl. No.: 33,944

[22] Filed: Apr. 3, 1987

[51] Int. Cl.$^4$ ............................................. C03B 5/027
[52] U.S. Cl. ......................................... 65/134; 65/135; 65/335; 65/337; 65/DIG. 4
[58] Field of Search ........... 65/134, 135, 335, DIG. 4, 65/337, 27

[56] References Cited

U.S. PATENT DOCUMENTS

| | | | |
|---|---|---|---|
| 1,830,481 | 11/1931 | Northrup . | |
| 1,906,594 | 5/1933 | Hitner . | |
| 2,465,283 | 3/1949 | Schlehr | 65/134 X |
| 3,205,292 | 9/1965 | Descarsin | 65/134 X |
| 3,244,495 | 4/1966 | Apple et al. | 65/161 |
| 3,461,215 | 8/1969 | Reboux . | |
| 3,572,671 | 3/1971 | Worner | 65/134 X |
| 3,764,286 | 10/1973 | Antczak et al. | 65/134 |
| 3,819,350 | 6/1974 | Pellett et al. | 65/134 |
| 3,951,635 | 4/1976 | Rough | 65/135 |
| 4,381,934 | 5/1983 | Kunkle et al. | 65/135 |
| 4,521,238 | 6/1985 | Heithoff | 65/135 |
| 4,545,798 | 10/1985 | Matesa | 65/27 |
| 4,610,711 | 9/1986 | Matesa et al. | 65/134 |

FOREIGN PATENT DOCUMENTS

| | | | |
|---|---|---|---|
| 746999 | 3/1956 | United Kingdom | 65/134 |
| 1439496 | 6/1976 | United Kingdom | 65/134 |

*Primary Examiner*—Robert L. Lindsay
*Attorney, Agent, or Firm*—Dennis G. Millman

[57] ABSTRACT

A melt of a material such as glass is inductively heated at a stage intermediate an initial liquefying stage and a refining stage. The function of the intermediate induction heating stage is essentially limited to raising the temperature of the melt a relatively minor amount to a refining temperature. Therefore, the induction heating stage may be compact with an intensified heating rate and rapid throughput, thereby permitting the induction heating zone to be a "cold" walled vessel without an appreciable effect on efficiency.

8 Claims, 1 Drawing Sheet

METHOD FOR RAPID INDUCTION HEATING OF MOLTEN GLASS OR THE LIKE

BACKGROUND OF THE INVENTION

This invention relates to electrically heating a body of molten material by means of induction. The invention is applicable to the melting of a material which is susceptible to having electric currents induced therein, and it is particularly applicable to the melting of glass or the like.

It is well known that material may be heated by induced currents when the material is placed within a coil carrying alternating current. An advantage of this type of heating is that the material being heated does not come into contact with the electrical source; e.g., electrodes need not be immersed in the melt. The general concept of inductively heating glass has been disclosed in many patents, for example, U.S. Pat. Nos. 1,830,481; 1,906,594; 3,205,292; and 3,244,495. Much of the prior art is limited to small scale embodiments, and large-scale melting of glass by induction heating has not found significant commercial acceptance. Thermal energy from combustion of fuel has generally been more economical than electric energy for glass melting. Moreover, induction heating has sometimes been considered to entail low efficiency in transferring electrical power into thermal energy. Also, it has been the belief of some in the art that large scale induction heating of glass would entail a prohibitively large induction coil.

In U.S. Pat. No. 4,610,711 (Matesa et al.) there is disclosed a more economical approach to using induction heating in a glassmaking process, wherein the induction heating is limited to raising the temperature of glass to its peak refining temperature at a downstream portion of the process. It would be desirable to utilize induction heating effectively at other stages of the glassmaking process.

Induction heating is capable of generating very high power densities, which can yield very high rates of energy transfer. Induction melting requires a vessel to hold the melt, and this vessel is also heated by the electric field. At high rates of heating, cooling of the vessel may be required to preserve its integrity or to retard contamination of the melt by erosion of the vessel. The cooling, however, reduces the efficiency of the heating process. An arrangement that maximizes melt purity at the expense of efficiency is shown in U.S. Pat. No. 3,461,215 (Reboux). There, cooling elements comprise the vessel and are in direct contact with the material being melted, whereby the rate of heat extraction is sufficient to maintain a layer of the material unmelted. The avoidance of contamination makes such an arrangement attractive for production of high quality glass, but for commercial mass production, the large energy losses would be economically prohibitive.

SUMMARY OF THE INVENTION

In the present invention, molten glass or the like is heated in a discrete stage by means of induction heating in a cooled vessel. The material entering the induction heating stage is preferably in an at least partially liquefied condition at an elevated temperature, and the function of the induction heating stage is to raise the temperature of the material to a relatively minor extent. For example, the material may be initially liquefied, i.e., partially melted to a fluid condition, in a preliminary stage employing radiant heat transfer such as that disclosed in U.S. Pat. No. 4,381,934 (Kunkle et al.) from which the liquefied material is discharged at temperatures somewhat below the overall peak processing temperature desired. In such a case, the induction heating stage of the present invention may serve to raise the temperature of the melt to a temperature desired for refining, i.e., expelling the gaseous content of the melt, prior to entering a refining stage. Since the induction heating is separate from any tther processing function, the residence time of the melt in the induction heating stage may be limited to the time necessary to effect the desired temperature increase. Because of the intense heat transfer that can be attained by induction heating, the desired temperature increase can be achieved in a short time. As a result, the induction heating vessel of the present invention can be relatively small, with a correspondingly small interior surface area in contact with the melt. A cooled vessel may be employed for the induction heating stage without a major loss of efficiency, even though a large temperature difference may exist between the melt and the vessel, because the small surface area limits the amount of heat lost to the cooled vessel. At the same time, the cooled vessel permits a very high level of induction to be generated within the melt in the vessel without deterioration of the vessel or contamination of the melt.

Because a very short residence time is provided in the induction heating vessel of the present invention, a subsequent stage is provided for completing the melting or refining of the glass. This refining stage may be comprised of any prior art arrangement adapted to Permit escape of gaseous inclusions from the melt. In its simplest form, the refining stage may constitute a conventional horizontally extended refractory box in which passive residence time is provided for refining. Since the melt enters from the induction heating stage at refining temperature, little or no heating need be provided in the refiner. A preferred refining technique is that disclosed in U.S. patent application Ser. No. 894,143 filed Aug. 7, 1986, wherein vacuum is employed to assist the refining.

These and other objects of the invention will be further understood from the drawings and the description of the preferred embodiment which follows.

THE DRAWINGS

DETAILED DESCRIPTION

Figures 1, 2:
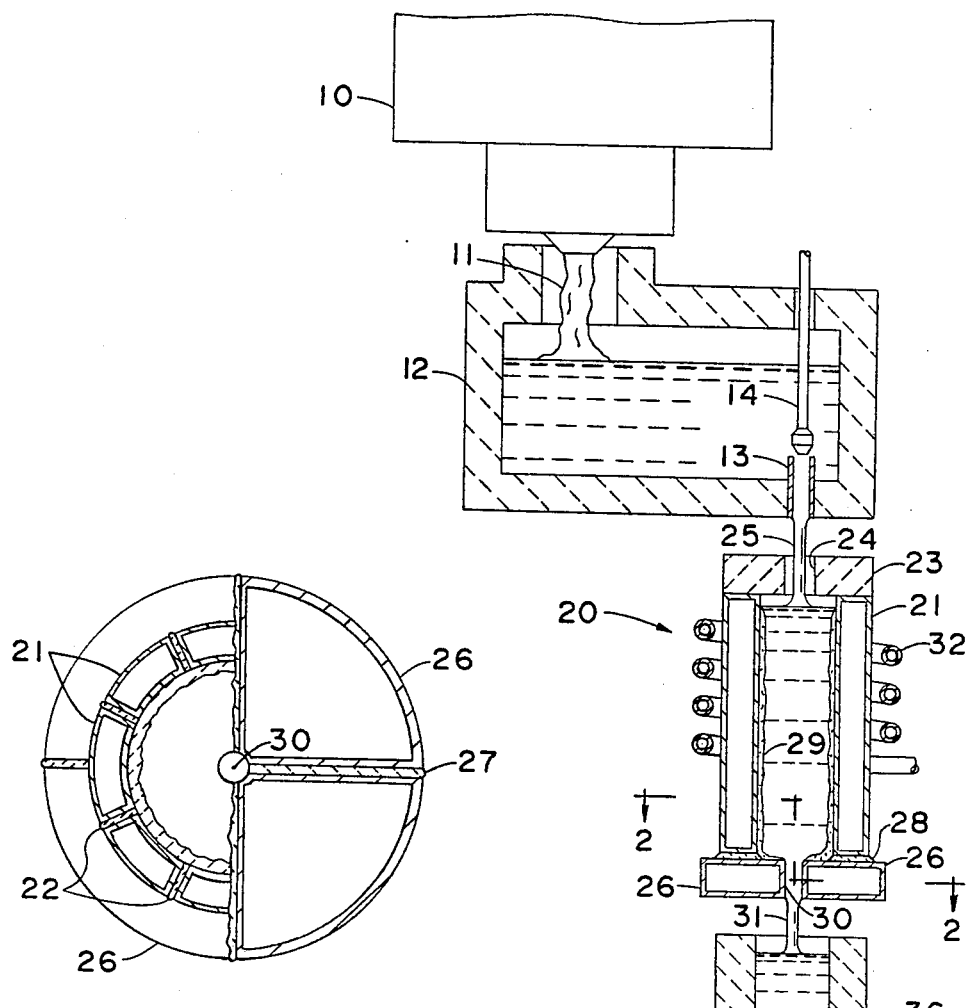
FIG. 1 is a side view of a preferred combination of a liquefier, receiving vessel, induction heater, surge vessel, and refiner, with the receiving vessel and induction heater shown in vertical section.
FIG. 2 is a horizontal cross-sectional view of the preferred induction heater embodiment taken along line 2—2 in FIG. 1.

The principles of the present invention are applicable to the inductive heating of a wide variety of molten materials, but the detailed description will relate primarily to an embodiment specifically designed to melt glass. Additionally, the specific embodiment to be described is adapted for continuous throughput at relatively high rates. The present invention is particularly advantageous under those conditions but is not limited thereto.

The string of components shown in FIG. 1 is a preferred combination wherein the induction heating lies between a liquefying stage and a refining stage. The induction heating follows a liquefying stage because it is more efficient to heat the raw batch materials to a temperature at which the material is susceptive to induced currents by means other than induction heating. In the case of glass batch, susceptibility becomes significant after melting has been initiated. The term "liquefy" is used herein to signify that melting has been initiated (i.e., there is a liquid phase present) but not necessarily completed. The liquefying step could be carried out by any means known in the art such as a conventional melting furnace heated by combustion or electric heating, but a preferred embodiment is the technique disclosed in U.S. Pat. No. 4,381,934, now Reissue Pat. No. 32,317 (Kunkle et al.). There, radiant heat, preferably from combustion, liquefies glass batch material on a sloped surface, and the liquefied material flows freely from the liquefying vessel before it has become fully melted. In FIG. 1, a liquefying vessel 10 of that type is shown schematically. The vessel 10 may be mounted for rotation about a vertical axis whereby a lining of batch material is retained on the interior side walls of the vessel to act as the surface on which the liquefaction takes place. A stream of liquefied material 11 flows from a bottom opening of the vessel 10.

The liquefied material 11 flowing from the preferred type of liquefying stage described above is generally foamy in nature and may include solid particles. This partially melted fluid could be introduced directly into the induction heating stage, but it is preferred to provide a receiving vessel 12 between the liquefying and induction heating stages to act as a surge reservoir to regulate flow to the induction heating stage. The receiving vessel 12 may also provide some residence time for some or all of any remaining solid particles in the liquefied material to dissolve. A outlet from the receiving vessel 12 may comprise a drain tube 13 through which flow may be regulated by valve means such as a conventional plunger 14 as shown in FIG. 1 that may be moved vertically to vary the outlet opening. Although the drain tube 13 is shown vertically extending through the bottom of the vessel 12, it should be apparent that the outlet could extend instead through a side wall and could employ other valve arrangements or no valve.

The preferred embodiment for the induction heater 20 shown in FIG. 1 is similar to that shown in U.S. Pat. No. 3,461,215 (Reboux), the disclosure of which is hereby incorporated by reference. The side wall portion of the vessel 20 is made of a plurality of hollow, vertically elongated slats 21 that are electrically insulated from each other by refractory spacers 22 which are preferably a material that is not contaminating to the material being melted, such as silica. By subdividing the vessel into a number of electrically insulated segments, induced current paths in the conductive material are shortened, thereby limiting voltage levels that can be generated and minimizing losses. Losses are also reduced by fabricating the slats 21 with walls as thin as possible within the requirements for structural strength. Increasing the number of slats in a vessel of a given size will reduce the losses due to induced currents in the vessel, but will increase the complexity and fabricating cost of the apparatus. Thus the number of slats is a matter of choice depending upon the relative importance of the efficiency of the induction heating system. A refractory lid 23, with an orifice 24 for introducing a stream of liquefied material 25 into the vessel, may be provided on top of the induction heating vessel to reduce heat loss therefrom. The bottom of the vessel may be formed of hollow, segmented, conductive sections 26 similar in manner to the slats 21 for the sake of reducing stray induced currents. The bottom sections 26 are electrically insulated from each other by refractory insulating layers 27 and from the bottoms of the slats 21 by an annular insulating layer 28. An opening 30 is provided in the bottom through which a stream 31 of the heated material may flow. Both the slats 21 and the bottom sections 26 are cooled by forcing cooling fluid (preferably water) through their hollow interiors at a rate sufficient to maintain their structural integrity under operating conditions.

The cooling of the induction heating vessel 20, and its construction of a conductive material causes a layer 29 of the melt to freeze on the interior of the vessel. The frozen layer separates the melt from the vessel walls, thereby avoiding corrosion of the vessel walls and avoiding contamination of the melt. The temperature of the layer is maintained sufficiently low by the cooling that the layer is not significantly susceptive to induced currents, while the molten material in the interior of the vessel is well within the range of significant susceptibility.

A coil 32 having a number of turns surrounds but is spaced from the annular arrangement of the slats 21 forming the vessel 20. The coil is formed of electrically conductive tubing (e.g., copper) through which coolant is passed to preserve the coil in the hot environment. In order to avoid excessively inducing wasteful currents in the bottom sections 26 and the related structural support members, the coil 32 is preferably spaced at least one coil diameter away from the bottom of the vessel 20. The coil is spaced from the slats 21 to avoid arcing therebetween but otherwise the diameter is preferably minimized to concentrate the electromagnetic flux within the vessel.

The induction coil 32 is wired across the secondary of a transformer in parallel with a capacitor. The capacitor and the coil establish a resonant circuit therebetween having high frequency and high amperage, thereby permitting the use of a small number of induction coil turns, e.g., one to five. The high amperage leads to high magnetic flux in spite of the small number of coil turns, thus providing the coil with substantial induction capabilities. Alternatively, magnetic flux could be increased by increasing the number of coil turns, but higher voltages would be required which would disadvantageously impose restrictions on the kind of electrical equipment that could be used. Typically, a plurality of capacitors in parallel with each other are employed to provide the desired total capacitance. The frequency and capacitance of the resonating circuit can be described by the following equation:

$$f = 1/[2\pi(LC)^{\frac{1}{2}}]$$

where:
 $f$ = the resonant frequency (Hz);
 $L$ = inductance of the coil (henrys);
 $C$ = capacitance (farads).

Other design calculations for induction heating coils are set forth by R. M. Baker in American Institute of Electrical Engineers Transactions, Vol. 76, Part 2, 1957, pp. 31–40.

Resistivity of molten glass varies with temperature, but a typical value is about 6 to 14 ohm-centimeters, which is high relative to materials to which induction heating is more conventionally applied. This leads to certain advantages in designing an induction heating system for glass melting. The current penetration depth in the material being heated is a key factor in the design of an induction heating system. Conventionally, it is recommended that the diameter of the material being heated be about three times the current penetration depth, (see, for example, British Patent Specification No. 1,430,382), but with molten glass it has been found that induction heating may be efficiently coupled to a body of molten glass whose diameter is equal to or less than the current penetration depth. Current penetration depth may be calculated as follows for glass:

$$d = 5033 \, (\rho/f)^{\frac{1}{2}}$$

where,
 d = current penetration depth in centimeters;
 $\rho$ = resistivity in ohm centimeters;
 f = frequency in Hertz.

Some theoretical aspects of induction heating as applied to melting glass are discussed by B. Scott and H. Rawson in Glass Technology, Vol. 14, No. 5, October 1973, pp. 115-124.

A conventional expedient in induction coil design is that the length of the coil be equal to or greater than its diameter, and that expedient is found applicable to the present invention as well. Effective transfer of power to the melt has been obtained with a coil length equal to its diameter, but a more efficient transfer of power may be possible with a longer coil length. The inside diameter of the induction heating vessel 20 is determined by anticipated throughput rates and residence time requirements. Minimizing the difference between the interior diameter of the vessel and the coil diameter results in advantages in that the magnetic flux is more usefully employed for inducing currents in the melt, thereby permitting the use of a relatively small coil with practical amperage requirements. For a given volume, it is generally desirable to minimize the height of the vessel so as to minimize the area for heat loss through the walls.

A feature of the present invention is that the induction heating is intensified in a small volume so that the heat loss through the walls of the vessel is a relatively insignificant factor due to the small area for heat transfer. Residence time of material passing through the induction heating vessel is also relatively short, on the order of a few minutes, typically less than 10 minutes, preferably less than 5 minutes. Power density within the induction heating vessel depends upon the amount of heating desired and the rate of throughput. In the preferred applications of the invention, the power density is at least 100 kilowatts per cubic foot (3.5 kilowatts per liter), typically on the order of 150 kilowatts per cubic foot (5.3 kilowatts per liter). At those power levels a temperature increase in molten glass on the order of 200 to 500 degrees Fahrenheit (100 to 280 degrees centigrade) may be achieved with a ratio of the mass of molten material held in the induction vessel to the mass throughput rate per twenty-four hour period of less than 0.1 and preferably less than 0.06. By way of example, a throughput of 12 tons per day (10.9 metric tons per day) could be accommodated under the above conditions by an induction heating vessel of about ten cubic feet (280 liters), which may be configured conveniently as a cylinder with an inside diameter of 1.5 feet (0.45 meter) and a height of 5.7 feet (1.7 meters). The power levels given above may be achieved with frequencies supplied to the coil of about 100 to 300 kilohertz. Considerably higher power densities may be provided if a greater rate of heating is desired.

Glass becomes a significant susceptor of induced currents only at elevated temperatures (at a resistivity preferably less than 14 ohm centimeters). Therefore, the melt in the present invention is heated to a susceptive temperature prior to entering the induction heating vessel, whereby the task of the induction heating step is limited to imparting a relatively moderate increase in temperature to the melt. The majority of the energy for melting and fining will have been imparted to the material before it enters the induction heating stage. The requirement for relatively costly electrical power is thus reduced and the inductive heating technique is applied where it is most effective—for increasing the temperature of material that is already hot. This is in contrast to radiant heat transfer, the efficiency of which is highly dependent on a temperature difference.

The temperatures involved will vary for different compositions, but as an example, a standard soda-lime-silica flat glass composition liquefies at a temperature of about 2100° F. (1150° C.) to 2400° F. (1315° C.), at which temperatures the melt exhibits significant susceptibility at reasonable voltages. Therefore, the glass may be passed directly from the liquefier 10 or receiving vessel 12 to the induction heating stage without additional thermal input. To assure adequate melting and refining of the glass of this example, it is generally considered desirable to raise its temperature to about 2500° F. (1370° C.) or as high as about 2800° F. (1540° C.). Accordingly, the induction heating stage may serve to raise the temperature about 100 to 700 degrees Fahrenheit (55 to 390 degrees centigrade). The particular refining temperature to which the melt is heated depends in part upon the refining technique employed in the subsequent refining stage. The present invention most advantageously entails a discrete, limited temperature increase by means of induction heating, but it should be apparent that greater temperature increases could be achieved if called for by particular situations.

Because no attempt is made to provide sufficient residence time in the induction heating vessel of the present invention to complete the refining, the melt is transferred from the induction heating stage to a separate refining stage. The invention is not limited to any particular refining method, but is particularly conducive to a refining process that is a discrete stage adapted specifically for refining. In other words, since substantially all of the thermal energy required for refining has been imparted to the melt when it leaves the induction heating stage, the refining stage may be adapted particularly for removal of gases from the melt. A preferred example is depicted in FIG. 1.

The preferred refining process for use in the present invention employs reduced pressure to remove gases from the melt. A vacuum refining chamber 35, the upper portion of which is shown in FIG. 1, may be provided to receive the melt from the induction heating vessel 20 A surge tank 36 may be interposed between the induction heating vessel and the refining chamber to assure a steady flow of molten material into the reduced pressure of the refining vessel. A tube 37 made of a non-contaminating material such as platinum may carry the molten stream from the surge tank 36 into the refining chamber 35. If desired, valve means (not shown) may interact with the tube 37 to modulate the flow rate into the refining chamber. The vacuum refining vessel could assume a variety of configurations as are known in the art, but the preferred embodiment involves a vertically elongated vessel generally cylindrical in shape, wherein the molten material is introduced into the upper portion and foams as it enters the reduced pressure headspace, collapses into a body of molten material forming a pressure equalizing column, and is withdrawn from a lower portion of the vessel at substantially atmospheric pressure. The vacuum refining vessel may comprise an air-tight, cooled, metallic sheath lined with refractory. Valve means may also be provided at the outlet to control the rate of flow from the vacuum refiner. The molten material in the refiner need not be heated any further, but with a cooled sheath, it may be desired to offset heat losses through the walls by providing an auxiliary heat source within the refiner. Generally, the peak temperature in a glass melting and refining process is provided in the refining zone to reduce the melt viscosity so as to expedite escape of gases. A vacuum assisted refining process need not rely as much on viscosity reduction, and therefore the peak temperature need not be as high. Thus, vacuum refining is an advantageous complement to the discrete induction heating technique of this invention because the lower temperature requirements permit shorter residence time in the cooled induction heating vessel. For example, a soda-lime-silica glass that would normally require a peak refining temperature of about 2800° F. (1540° C.) may be refined under vacuum at temperatures no higher than 2600° F. (1430° C.). The lower the pressure in a vacuum refining stage, the lower the peak refining temperature required.

The present invention has particular applicability to continuous production of glass on a relatively large commercial scale, which may be characterized by a production rate of at least 10 tons (9 metric tons) of glass per day.

Other variations and modifications as would be known to those of skill in the art may be resorted to without departing from the scope of the invention as defined by the claims that follow.

I claim:
1. A method of melting and refining glass comprising: providing a melt of unrefined glass at a first stage; transferring the melt to a second stage comprising a metallic vessel of small volume relative to other stages of the process, holding a mass of the melt in the vessel less than 0.1 times the daily throughput of the process, cooling the metallic vessel by circulating coolant fluid in contact therewith sufficiently to maintain a solidified layer of the melt on the interior of the vessel, and electromagnetically inducing electric currents in the melt within the vessel by means of a coil around the metallic vessel to which is supplied high frequency alternating current to induce electric currents of at least 100 killowatts per cubic foot (3.5 kilowatts per liter) so as to rapidly raise the temperature of the melt to a refining temperature; and after a resistance time in the second stage insufficient to significantly refine the melt, transferring the heated melt to a third stage where the melt is refined.

2. The method of claim 1 wherein the volume of melt held in the second stage vessel is less than 0.06 times the daily throughput of the process.

3. The method of claim 1 wherein the temperature of the melt is raised in the second stage 100° F. (55° C.) to 700° F. (390° C.).

4. The method of claim 1 wherein the average residence time of melt in the second stage is less than 10 minutes.

5. The method of claim 1 wherein the melt is subjected to sub-atmospheric pressure in the third stage.

6. The method of claim 1 wherein the glass is melted and refined at a rate of at least 10 tons per day.

7. The method of claim 6 wherein the glass is soda-lime-silica glass.

8. The method of claim 1 wherein the average residence time of melt in the second stage is less than five minutes.

* * * * *

UNITED STATES PATENT AND TRADEMARK OFFICE
CERTIFICATE OF CORRECTION

PATENT NO. : 4,780,121

DATED : October 25, 1988

INVENTOR(S) : Joseph M. Matesa

It is certified that error appears in the above-identified patent and that said Letters Patent is hereby corrected as shown below:

Claim 1 (column 8, line 19), "resistance" should be "residence".

Signed and Sealed this

Thirty-first Day of October, 1989

Attest:

DONALD J. QUIGG

*Attesting Officer*   *Commissioner of Patents and Trademarks*